(12) United States Patent
Kumagai et al.

(10) Patent No.: US 11,826,947 B2
(45) Date of Patent: Nov. 28, 2023

(54) 3D OBJECT PRINT APPARATUS AND METHOD

(71) Applicant: Seiko Epson Corporation, Tokyo (JP)

(72) Inventors: Masaru Kumagai, Shiojiri (JP); Yuki Ishii, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/503,496

(22) Filed: Oct. 18, 2021

(65) Prior Publication Data

US 2022/0118680 A1 Apr. 21, 2022

(30) Foreign Application Priority Data

Oct. 19, 2020 (JP) ................................. 2020-175184

(51) Int. Cl.
*B29C 64/106* (2017.01)
*B29C 64/227* (2017.01)
*B25J 11/00* (2006.01)
*B41J 3/407* (2006.01)
*B41J 11/00* (2006.01)
(Continued)

(52) U.S. Cl.
CPC ............. *B29C 64/106* (2017.08); *B25J 11/00* (2013.01); *B29C 64/227* (2017.08); *B41J 3/4073* (2013.01); *B41J 11/00212* (2021.01); *B41J 11/00214* (2021.01); *B41J 11/00218* (2021.01);
(Continued)

(58) Field of Classification Search
CPC ...... B29C 64/106; B29C 64/227; B25J 11/00; B41J 3/4073; B41J 11/00212; B41J 11/00214; B41J 11/00218; B41M 5/0088; B41M 7/0081

See application file for complete search history.

(56) References Cited

U.S. PATENT DOCUMENTS 9,636,928 B2 * 5/2017 Noell .................... B41J 25/316
2013/0057608 A1 * 3/2013 Yamamoto ............. G03B 35/24
347/102
(Continued)

FOREIGN PATENT DOCUMENTS

DE 102015202616 4/2015
JP 2006-021435 1/2006
(Continued)

*Primary Examiner* — Justin Seo
*Assistant Examiner* — Tracey M McMillion
(74) *Attorney, Agent, or Firm* — WORKMAN NYDEGGER

(57) ABSTRACT

A three-dimensional object print apparatus performs a first step at which a liquid ejecting head ejects liquid onto a workpiece and simultaneously a moving mechanism changes a location of the liquid ejecting head relative to the workpiece along a first route and further performs a second step at which an energy emitting section irradiates the liquid on the workpiece with energy and simultaneously the moving mechanism changes the location of the liquid ejecting head relative to the workpiece along a second route. In this case, L1<L2 at the first step and L1>L2 at the second step, where L1 denotes a distance in a direction normal to a nozzle surface of the liquid ejecting head between the workpiece and the nozzle surface, and L2 denotes a distance in a direction normal to an emission surface of the energy emitting section between the workpiece and the emission surface.

11 Claims, 5 Drawing Sheets

(51) Int. Cl.
    *B41M 5/00*      (2006.01)
    *B41M 7/00*      (2006.01)

(52) U.S. Cl.
    CPC ........ *B41M 5/0088* (2013.01); *B41M 7/0081*
                                                      (2013.01)

(56)                References Cited

U.S. PATENT DOCUMENTS

2014/0063096 A1    3/2014  Pitz
2015/0042716 A1    2/2015  Beier et al.
2017/0283655 A1*   10/2017 Kenney ................ B29C 64/118

FOREIGN PATENT DOCUMENTS

JP       2015-520011      7/2015
JP       2017-019059      1/2017
JP       2017-144641      8/2017
JP       2020-040037      3/2020

\* cited by examiner

3D OBJECT PRINT APPARATUS AND METHOD

The present application is based on, and claims priority from JP Application Serial Number 2020-175184, filed Oct. 19, 2020, the disclosure of which is hereby incorporated by reference herein in its entirety.

BACKGROUND

1. Technical Field

The present disclosure relates to a 3D object print apparatus and method.

2. Related Art

Three-dimensional (3D) object print apparatuses known in the art are configured to print information on the surface of an object having a 3D shape in accordance with ink jet scheme. As an example, JP-T-2015-520011 discloses a 3D object print apparatus that includes: a robot; and a print head disposed in the robot. This print head ejects ink droplets onto a curved surface of a vehicle.

The disclosed 3D print apparatus further includes a curing head in the robot adjacent to the print head. This curing head follows the movement of the print head, thereby curing the ink on the vehicle surface immediately after the ink has been placed thereon.

In the disclosed 3D object print apparatus, the print head and the curing head are arranged adjacent to each other with their positional relationship fixed. Therefore, the curing head may be unable to move to a desired location or have a desired posture, depending on the location and posture of the print head. In other words, one of the print head and the curing head may be unable to have a desired posture at a desired location. For example, if the print head is set in a desired posture at a desired location for the sake of its print quality, the curing head may be unable to be set in a desired posture at a desired location. In which case, the curing head may fail to cure the ink efficiently.

SUMMARY

According to an aspect of the present disclosure, a three-dimensional object print apparatus includes: a liquid ejecting head having a nozzle surface provided with a nozzle through which liquid is to be ejected; an energy emitting section having an emission surface from which energy is to be emitted, the energy being used to cure or solidify the liquid from the liquid ejecting head; and a moving mechanism that changes locations and postures of the liquid ejecting head and the energy emitting section relative to a workpiece, the workpiece having a three-dimensional shape. The three-dimensional object print apparatus performs a first step at which the liquid ejecting head ejects the liquid onto the workpiece and simultaneously the moving mechanism changes the location of the liquid ejecting head relative to the workpiece. Furthermore, the three-dimensional object print apparatus performs a second step at which the energy emitting section irradiates the liquid on the workpiece with the energy, and simultaneously the moving mechanism changes the location of the liquid ejecting head relative to the workpiece. In this case, L1<L2 at the first step and L1>L2 at the second step, where L1 denotes a distance in a direction normal to the nozzle surface between the workpiece and the nozzle surface, and L2 denotes a distance in a direction normal to the emission surface between the workpiece and the emission surface.

According to another aspect of the present disclosure, a three-dimensional object print method of printing information on a workpiece having a three-dimensional shape uses an apparatus and a moving mechanism. The apparatus includes: a liquid ejecting head having a nozzle surface provided with a nozzle through which liquid is to be ejected; and an energy emitting section having an emission surface from which energy is to be emitted, the energy being used to cure or solidify the liquid from the liquid ejecting head. The moving mechanism changes a location and a posture of the apparatus relative to the workpiece. This three-dimensional object print method includes: setting a first reference point that indicates a location in the apparatus, a second reference point that indicates another location in the apparatus, a first route along which the first reference point is to move, and a second route along which the second reference point is to move; performing a first step at which the liquid ejecting head ejects the liquid onto the workpiece and simultaneously the moving mechanism changes a location of the first reference point relative to the workpiece along the first route; and performing a second step at which the energy emitting section irradiates the liquid on the workpiece with the energy and simultaneously the moving mechanism changes a location of the second reference point relative to the workpiece along the second route.

According to still another aspect of the present disclosure, a three-dimensional object print method of printing information on a workpiece having a three-dimensional shape uses a liquid ejecting head and an energy emitting section. The liquid ejecting head has a nozzle surface provided with a nozzle through which liquid is to be ejected. The energy emitting section has an emission surface from which energy is to be emitted, the energy being used to cure or solidify the liquid from the liquid ejecting head. This three-dimensional object print method includes: performing a first step of ejecting the liquid from the liquid ejecting head onto the workpiece and simultaneously changing a location of the liquid ejecting head relative to the workpiece along a first route; and performing a second step of irradiating the liquid on the workpiece with the energy from the energy emitting section and simultaneously changing the location of the liquid ejecting head relative to the workpiece along a second route. In this case, L1<L2 at the first step and L1>L2 at the second step, where L1 denotes a distance in a direction normal to the nozzle surface between the workpiece and the nozzle surface, and L2 denotes a distance in a direction normal to the emission surface between the workpiece and the emission surface.

DESCRIPTION OF EXEMPLARY EMBODIMENTS

Some embodiments of the present disclosure will be described below with reference to the accompanying drawings. It should be noted that the sizes and scales of components illustrated in the individual drawings may be different from real ones, and some of them are depicted in a schematic manner for the purpose of better understanding. Moreover, the scope of the present disclosure is not limited to those embodiments unless otherwise specified.

Each drawing illustrates mutually orthogonal X-, Y-, and Z-axes. Further, one direction along the X-axis is defined as an X1 direction, whereas the direction opposite to the X1 direction is defined as an X2 direction; one direction along the Y-axis is defined as a Y1 direction, whereas the direction opposite to the Y1 direction is defined as a Y2 direction; and one direction along the Z-axis is defined as a Z1 direction, whereas the direction opposite to the Z1 direction is defined as a Z2 direction.

The X-, Y-, and Z-axes correspond to coordinate axes in a base coordinate system defined inside the space in which a workpiece W and a base 210 (described later) are disposed. Further, the Z-axis corresponds to the vertical axis, and the Z2 direction corresponds to the downward direction. It should be noted that the Z-axis does not necessarily have to be the vertical axis, and the X-, Y-, and Z-axes do not necessarily have to be mutually orthogonal; alternatively, the X-, Y-, and Z-axes may form angles ranging from 80° to 100° with one another.

1. Embodiment 1-1. Outline of Three-Dimensional Object Print Apparatus

Figure 1:
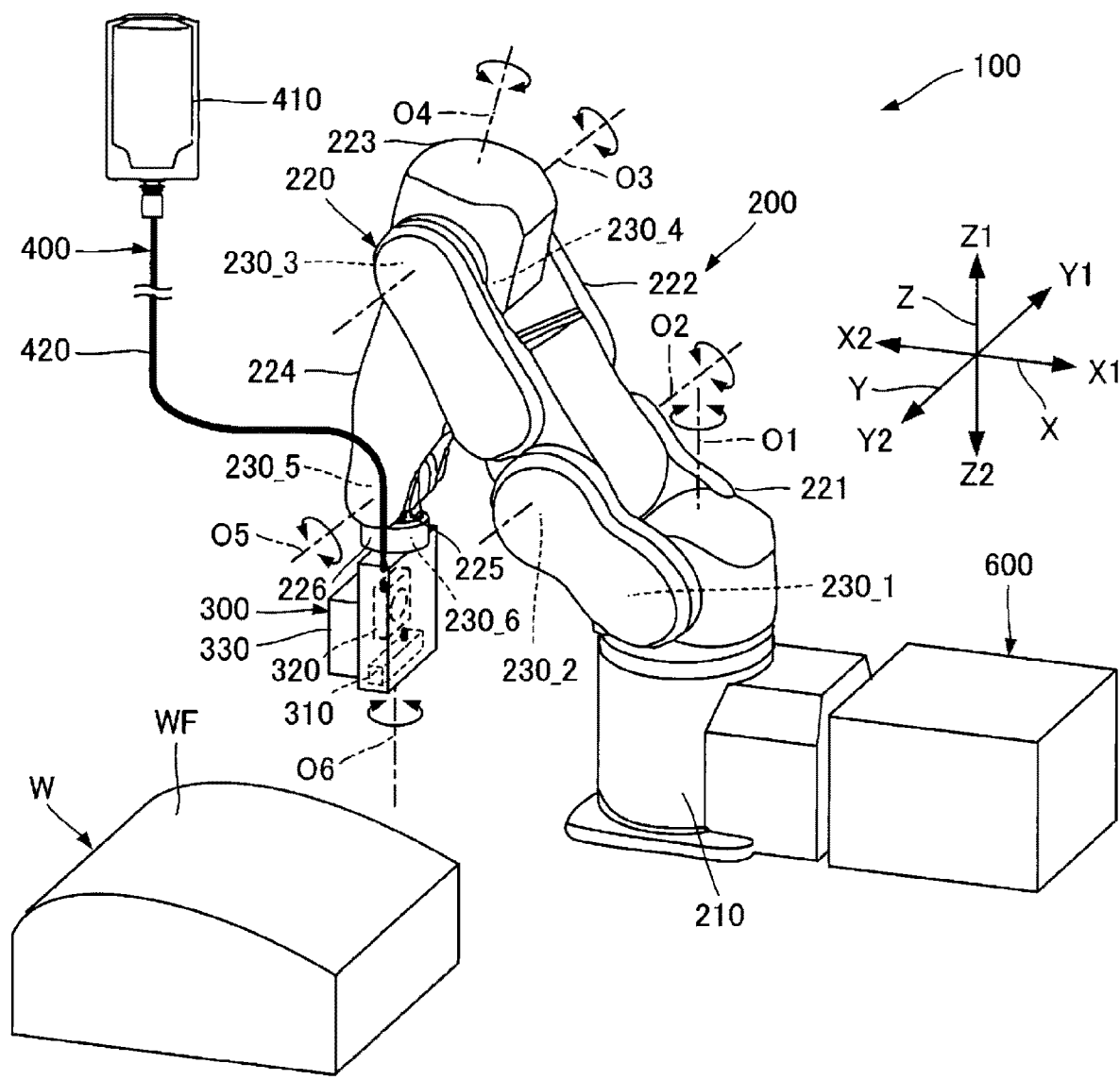
FIG. 1 is a schematic, perspective view of a three-dimensional (3D) object print apparatus according to an embodiment of the present disclosure.

FIG. 1 is a schematic, perspective view of a three-dimensional (3D) object print apparatus 100 according to an embodiment of the present disclosure. The 3D object print apparatus 100 is configured to print information on the surface of a workpiece W having a 3D shape in accordance with ink jet scheme.

The workpiece W has a surface WF to which information is to be printed. In the example of FIG. 1, the surface WF is a bulging surface with a discontinuous curvature; however, the information may be printed on another surface of the workpiece W. In addition, the dimensions, shape, and orientation of the workpiece W disposed are not limited to those in FIG. 1, and it may have any other dimensions, shape, and orientation.

In the example of FIG. 1, the 3D object print apparatus 100 is an ink jet printer that includes a vertical articulated robot. As illustrated in FIG. 1, the 3D object print apparatus 100 includes a robot 200, a liquid ejecting unit 300, a liquid supply unit 400, and a controller 600. Such components of the 3D object print apparatus 100 illustrated in FIG. 1 will be described below in order.

The robot 200 is a moving mechanism that can move the liquid ejecting unit 300 relative to the workpiece W and change the posture of the liquid ejecting unit 300. In the example of FIG. 1, the robot 200 is a six-axis vertical articulated robot that includes a base 210 and an arm 220.

The base 210 supports the arm 220 and is fixed to an installation surface, such as a floor, with screws or another mechanism. In the example of FIG. 1, the installation surface to which the base 210 is fixed faces upward, namely, in the Z1 direction; however, it may face in any other direction. In addition, the installation surface is not limited to the floor; alternatively, it may be a wall, a ceiling, or a truck bed.

The arm 220 is a six-axis robot arm having two ends: a first end is attached to the base 210; and a second end can move in a 3D manner relative to the first end and change its posture. The arm 220 includes arm members 221, 222, 223, 224, 225, and 226, which are all coupled together in series.

The arm member 221 is coupled to the base 210 via a joint 230_1 so as to be rotatable around a first rotatable axis O1. The arm member 222 is coupled to the arm member 221 via a joint 230_2 so as to be rotatable around a second rotatable axis O2. The arm member 223 is coupled to the arm member 222 via a joint 230_3 so as to be rotatable around a third rotatable axis O3. The arm member 224 is coupled to the arm member 223 via a joint 230_4 so as to be rotatable around a fourth rotatable axis O4. The arm member 225 is coupled to the arm member 224 via a joint 230_5 so as to be rotatable around a fifth rotatable axis O5. The arm member 226 is coupled to the arm member 225 via a joint 230_6 so as to be rotatable around a sixth rotatable axis O6.

Hereinafter, each of the joints 230_1 to 230_6 is sometimes referred to as a joint 230.

An N number of joints 230 (N is six in FIG. 1) are an example of a movable part herein. In the example of FIG. 1, each of the joints 230_1 to 230_6 is a mechanism for coupling two adjacent arms in such a way that one of the arms is rotatable relative to the other. Each of the joints 230_1 to 230_6 has a drive mechanism (not illustrated in FIG. 1) for rotating one of two adjacent arms relative to the other, which includes: for example, a motor that generates drive power for the rotation; a speed reducer that outputs reduced drive power; and an encoder, such as a rotary encoder, that detects a movement amount such as a rotation angle. The group of these drive mechanisms corresponds to an arm drive mechanism 240 (see FIG. 2), and the encoders correspond to encoders 241 (see FIG. 2).

The first rotatable axis O1 is an axis vertical to the installation surface (not illustrated) to which the base 210 is fixed; the second rotatable axis O2 is an axis vertical to the first rotatable axis O1; the third rotatable axis O3 is an axis parallel to the second rotatable axis O2; the fourth rotatable axis O4 is an axis vertical to the third rotatable axis O3; the fifth rotatable axis O5 is an axis vertical to the fourth rotatable axis O4; and the sixth rotatable axis O6 is an axis vertical to the fifth rotatable axis O5.

Herein, the description "one rotatable axis is vertical to another" implies that the angle therebetween is about 90°±5°. Likewise, the description "one rotatable axis is parallel to another" implies that the angle therebetween is about 0°±5°.

The second end of the arm 220, more specifically, the arm member 226 is provided with the liquid ejecting unit 300 as an end effector.

The liquid ejecting unit 300 is an apparatus that includes: a liquid ejecting head 310 that ejects liquid, or ink in this case, onto the workpiece W; and an energy emitting section 330 that emits energy for curing or solidifying the ink that the liquid ejecting head 310 has ejected on the workpiece W. In this embodiment, in addition to the liquid ejecting head 310 and the energy emitting section 330, the liquid ejecting unit 300 further includes a pressure regulating valve 320 that regulates pressure applied to the ink to be supplied to the liquid ejecting head 310. All of the liquid ejecting head 310, the energy emitting section 330, and the liquid ejecting unit 300 are fixed to the arm member 226 so that the relationship of their locations and postures is fixed.

Examples of the ink include, but are not limited to: water-based ink containing a water-based solvent and a color material such as a dye or a pigment dissolved in the water-based solvent; curable ink containing a curable resin such as an ultraviolet (UV) one; and solvent-based ink containing an organic solvent and a color material such as a dye or a pigment. Among these, curable ink is the most preferable. Examples of such curable ink include, but are not limited to, thermal-curable ink, light-curable ink, radiation-curable ink, and electron-beam-curable ink. Among these, light-curable ink such as UV-curable ink is the most preferable. The ink is not limited to aquatic ink; alternatively, it may be ink in which a color material is dispersed as a dispersoid in a dispersion medium.

Furthermore, the ink does not necessarily have to contain a color material; alternatively, it may contain conductive particles, such as metal particles, as a dispersoid, which are usually used to form electrical wires.

The liquid ejecting head 310 includes piezoelectric elements, cavities in which the ink is filled, and nozzles leading to corresponding cavities, all of which are not illustrated in FIG. 1. The piezoelectric elements are provided for the respective cavities and vary the pressures therein to push the ink to the outside through corresponding nozzles. The liquid ejecting head 310 configured above may be prepared by appropriately forming a plurality of substrates, such as silicon substrates, with etching and bonding them together with glue, for example. The piezoelectric elements correspond to piezoelectric elements 311 in FIG. 2. Instead of such piezoelectric elements, heaters may be used as drive elements. In which case, the heaters may heat the ink in the cavities and push the ink to the outside through the nozzles.

The pressure regulating valve 320 opens or closes, depending on the strength of the pressure applied to the ink in the liquid ejecting head 310. This operation maintains the ink in the liquid ejecting head 310 at negative pressure within a predetermined range, thereby stably forming the meniscus of the ink within each nozzle N in the liquid ejecting head 310. Consequently, it is possible to suppress the ink from being bubbled inside the nozzles N or leaking to the outside through the nozzles N.

In the example of FIG. 1, the liquid ejecting unit 300 has a single liquid ejecting head 310 and a single pressure regulating valve 320; however, the numbers of liquid ejecting head 310 and pressure regulating valve 320 are not limited. Alternatively, it may have two or more ejecting heads 310 and two or more pressure regulating valves 320. The location at which the pressure regulating valve 320 is disposed is not limited to inside the arm member 226; alternatively, it may be inside another arm member or a predetermined stationary part relative to the base 210.

The energy emitting section 330 emits energy, such as light, heat, an electron beam, or radioactive rays, depending on the ink type. For example, if UV-curable ink is to be used, the energy emitting section 330 emits UV light. The configuration of the energy emitting section 330 depends on which energy is used. If the energy is UV light, the energy emitting section 330 may have a light source with a light emitting device, such as a light emitting diode (LED), that emits UV light. Optionally, the energy emitting section 330 further includes an optical component, such as a lens, to narrow down the emission direction or area of the energy.

The energy emitting section 330 preferably adjusts the intensity of the energy to be emitted. In this case, the energy emitting section 330 can decrease the energy intensity to reduce the risk of the nozzles clogged during a print operation and, in turn, can increase the energy intensity to cure or solidify the ink in a short time during a curing operation; details of the print and curing operations will be described later.

The liquid supply unit 400 is a mechanism for supplying the ink to the liquid ejecting head 310 which includes a liquid reservoir 410 and a supply flow passage 420.

The liquid reservoir 410, which may be an ink pack formed of a flexible film, is a container in which the ink is stored.

In the example of FIG. 1, the liquid reservoir 410 is fixed to a wall, a ceiling, or a pillar, for example, so as to be always positioned closer to the Z1-side on the page of FIG. 1 than the liquid ejecting head 310 is. In short, the liquid reservoir 410 is positioned higher than the movable range of the liquid ejecting head 310 in the vertical direction. As a result, the liquid reservoir 410 can supply the ink to the liquid ejecting head 310 at a predetermined pressure without using a pumping mechanism.

If the liquid reservoir 410 can supply the ink to the liquid ejecting head 310 at a predetermined pressure, it may be positioned at any location, such as that lower than the liquid ejecting head 310 in the vertical direction. In this case, the liquid reservoir 410 may have a pump to supply the ink to the liquid ejecting head 310 at a predetermined pressure.

The supply flow passage 420 is a flow passage along which the liquid reservoir 410 supplies the ink to the liquid ejecting head 310. The supply flow passage 420 is provided with the pressure regulating valve 320 at its midway location, which regulates the pressure applied to the ink in the liquid ejecting head 310 independently of the positional relationship between the liquid ejecting head 310 and the liquid reservoir 410.

The supply flow passage 420 may be the inner space of a tubular body made of a flexible, elastic material such as a rubber or elastomer material. Forming the supply flow passage 420 inside a flexible tubular body permits the change in the relative positional relationship between the liquid reservoir 410 and the pressure regulating valve 320. Thus, even if the location or posture of the liquid ejecting head 310 changes with the liquid reservoir 410 fixed, the liquid reservoir 410 can continue to supply the ink to the pressure regulating valve 320.

Alternatively, the supply flow passage 420 may be partly made of a rigid material. Furthermore, the supply flow passage 420 may have a splitter that divides the ink flow passage into a plurality of ink flow passages and may be integrated with the liquid ejecting head 310 or the pressure regulating valve 320.

The controller 600, which is a robot controller that controls the operation of the robot 200, is electrically connected to a control module (not illustrated in FIG. 1) that controls the ink ejecting operation of the liquid ejecting unit 300. In addition, both of the controller 600 and the control module are communicably connected to a computer. Herein, the control module corresponds to a control module 500 in FIG. 2; the computer corresponds to a computer 700 in FIG. 2.

1-2. Electrical Configuration of 3D Object Print Apparatus

Figure 2:
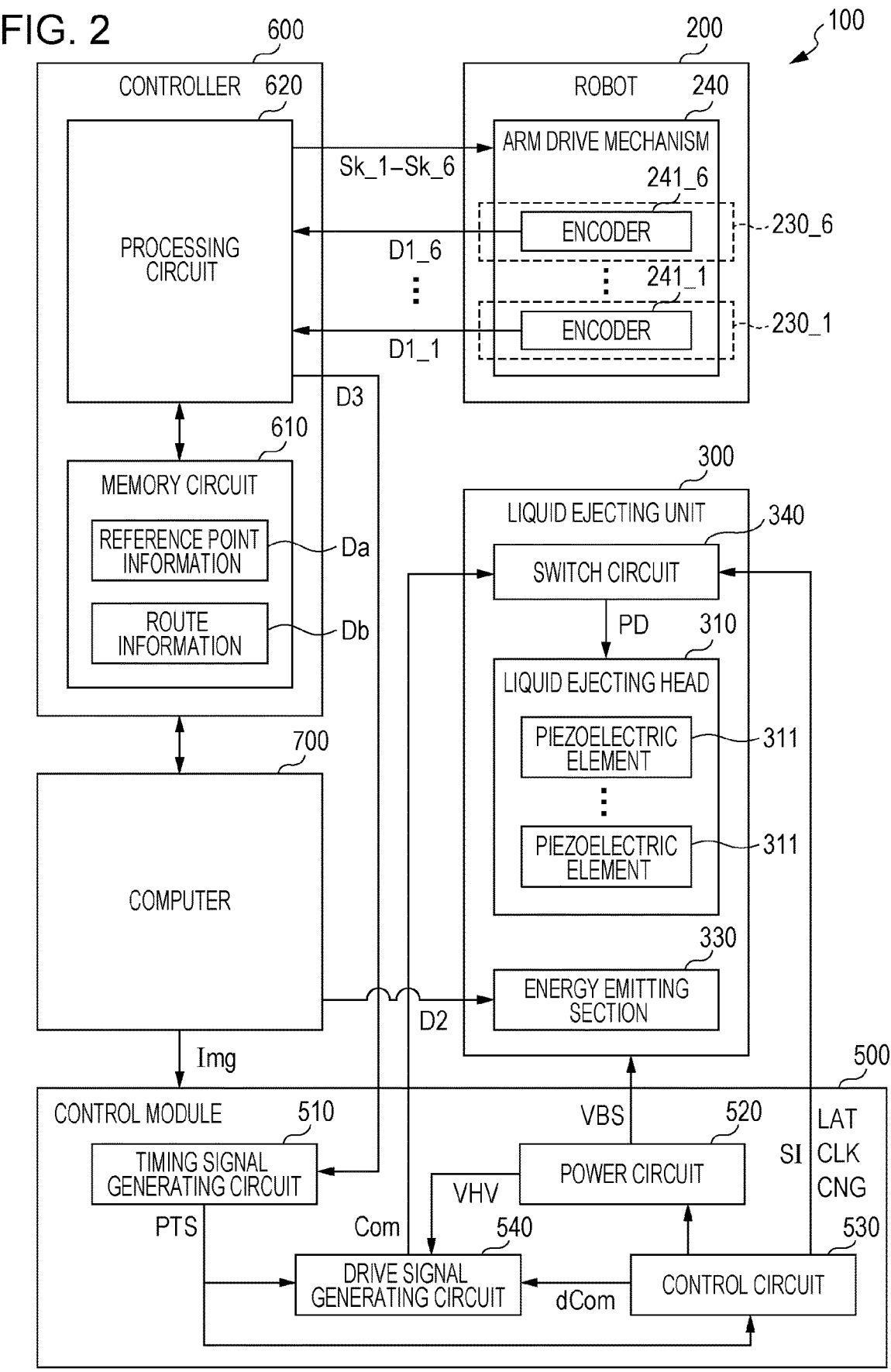
FIG. 2 is a block diagram of an electrical configuration of the 3D object print apparatus.

FIG. 2 is a block diagram of an electrical configuration of the 3D object print apparatus 100. In other words, FIG. 2 illustrates electrical components in the 3D object print apparatus 100. As illustrated in FIG. 2, the arm drive mechanism 240 is provided with the encoders 241_1 to 241_6 and the drive mechanisms for moving the joints 230_1 to 230_6. Further, the encoder 241_1 is provided for the joint 230_1 and measures a movement amount such as a rotation angle of the joint 230_1. Likewise, the encoder 241_2 is provided for the joint 230_2 and measures a movement amount such as a rotation angle of the joint 230_2. The encoder 241_3 is provided for the joint 230_3 and measures a movement amount such as a rotation angle of the joint 230_3. The encoder 241_4 is provided for the joint 230_4 and measures a movement amount such as a rotation angle of the joint 230_4. The encoder 241_5 is provided for the joint 230_5 and measures a movement amount such as a rotation angle of the joint 230_5. The encoder 241_6 is provided for the joint 230_6 and measures a movement amount such as a rotation angle of the joint 230_6. Hereafter, each of the encoders 241_1 to 241_6 is sometimes referred to below as an encoder 241.

As illustrated in FIG. 2, the 3D object print apparatus 100 is provided with the robot 200, the liquid ejecting unit 300, the controller 600, the control module 500, and the computer 700. It should be noted that each of the electrical components that will be described below may be further divided into multiple components, one of the electrical components may be included in another, or some of the electrical components may be combined together, as appropriate. For example, some or all of the functions of the control module 500 or the controller 600 may be realized by the computer 700 connected to the controller 600 or by another external device such as a personal computer (PC) connected to the controller 600 over a network such as a local area network (LAN) or the Internet.

The controller 600 controls the operation of the robot 200 and generates a signal D3 for causing the liquid ejecting head 310 to eject the ink in synchronism with the operation of the robot 200. The controller 600 includes a memory circuit 610 and a processing circuit 620.

The memory circuit 610 stores programs to be executed and data to be processed by the processing circuit 620. The memory circuit 610 may contain one or both of volatile semiconductor memory and nonvolatile semiconductor memory: examples of the volatile semiconductor memory include a random access memory (RAM); and examples of the nonvolatile semiconductor memory includes a read only memory (ROM), an electrically erasable programmable read-only memory (EEPROM), and a programmable ROM (PROM). In this case, the memory circuit 610 may be partly or entirely contained in the processing circuit 620.

The memory circuit 610 stores reference point information Da and route information db. The reference point information Da is information regarding locations of the liquid ejecting head 310 and the energy emitting section 330. More specifically, the reference point information Da is information regarding first reference point TCP1 and second reference point TCP2 to which the tool center points are set; details of the first reference point TCP1 and the second reference point TCP2 will be described later.

The route information db is information indicating the routes along which the liquid ejecting head 310 and the energy emitting section 330 are to move. More specifically, the route information db contains information regarding a first route RU_1 along which the first reference point TCP1 is to move and a second route RU_2 along which the second reference point TCP2 is to move. Details of the first route RU_1 and the second route RU_2 will be described later. In this case, the first route RU_1 and the second route RU_2 may or may not coincide with each other. The route information db may be represented by coordinate values in the base coordinate system. The route information db is determined based on workpiece information that indicates the location and shape of the workpiece W; the workpiece information may be obtained by relating information regarding computer-aided design (CAD) data that indicates the 3D shape of the workpiece W to the base coordinate system. The route information db is transmitted from the computer 700 to the memory circuit 610.

The processing circuit 620 controls the movements of the joints 230_1 to 230_6 based on the route information db and generates the signal D3. More specifically, the processing circuit 620 makes inverse-kinematic calculation by which the route information db is converted into the movement amounts, such as the rotation angles and rotation speeds, of the joints 230_1 to 230_6. Then, the processing circuit 620 outputs control signals Sk_1 to Sk_6 based on outputs D1_1 to D1_6, respectively, from the encoders 241_1 to 241_6 included in the arm drive mechanism 240 in the robot 200. In this case, the control signals Sk_1 to Sk_6 are generated so that actual movement amounts, such as actual rotation angles and rotation speeds, of the joints 230_1 to 230_6 coincide with the above calculations. The control signal Sk_1 is related to joint 230_1 and controls the drive of a motor disposed in the joint 230_1. Likewise, the control signal Sk_2 is related to joint 230_2 and controls the drive of a motor disposed in the joint 230_2. The control signal Sk_3 is related to joint 230_3 and controls the drive of a motor disposed in the joint 230_3. The control signal Sk_4 is related to joint 230_4 and controls the drive of a motor disposed in the joint 230_4. The control signal Sk_5 is related to joint 230_5 and controls the drive of a motor disposed in the joint 230_5.

The control signal Sk_6 is related to joint 230_6 and controls the drive of a motor disposed in the joint 230_6. The output D1_1 is related to the encoder 241_1; the output D1_2 is related to the encoder 241_2; the output D1_3 is related to the encoder 241_3; the output D1_4 is related to the encoder 241_4; the output D1_5 is related to the encoder 241_5; and the output D1_6 is related to the encoder 241_6. Hereinafter, each of the outputs D1_1 to D1_6 is sometimes referred to as an output D1.

The processing circuit 620 generates the signal D3 based on the output D1 from at least one of the encoders 241_1 to 241_6. For example, the processing circuit 620 generates, as the signal D3, a trigger signal containing a pulse with a timing at which the output D1 from an encoder 241, which is one of the encoders 241_1 to 241_6, becomes a predetermined value.

For example, the processing circuit 620 includes one or more central processing units (CPUs) and/or a programmable logic device such as a field-programmable gate array (FPGA).

The control module 500 is a circuit that controls the ink ejecting operation of the liquid ejecting head 310 based on the signal D3 from the controller 600 and print data from the computer 700. The control module 500 includes a timing signal generating circuit 510, a power circuit 520, a control circuit 530, and a drive signal generating circuit 540.

The timing signal generating circuit 510 generates a timing signal PTS based on the signal D3. The timing signal generating circuit 510 may be a timer that starts generating the timing signal PTS in response to the detection of the signal D3.

The power circuit 520 is powered by a commercial power source (not illustrated) and generates given potentials to be applied to predetermined sections in the 3D object print apparatus 100. For example, the power circuit 520 applies an offset potential VBS to the liquid ejecting unit 300 and a power potential VHV to the drive signal generating circuit 540.

The control circuit 530 generates a control signal SI, a waveform designating signal dCom, a latch signal LAT, a clock signal CLK, and a change signal CNG, based on and in synchronization with the timing signal PTS. Then, the control circuit 530 supplies the waveform designating signal dCom to the drive signal generating circuit 540 and the remaining signals to a switch circuit 340 in the liquid ejecting unit 300.

The control signal SI is a digital signal for use in determining the operational states of the piezoelectric elements 311 in the liquid ejecting head 310. More specifically, the control signal SI is used to determine whether to supply a drive signal Com (described later) to the piezoelectric elements 311. In this way, for example, the control signal SI is used to instruct the piezoelectric elements 311 to eject the ink through the corresponding nozzles and also to specify the amounts of ink ejected through these nozzles. The waveform designating signal dCom is a digital signal for use in specifying the waveform of the drive signal Com. Both of the latch signal LAT and the change signal CNG are used together with the control signal SI to determine the drive timings of the piezoelectric elements 311, or the timings at which the ink is to be ejected through the nozzles. The clock signal CLK is a reference clock signal synchronized with the timing signal PTS. Of the above signals, those supplied to the switch circuit 340 in the liquid ejecting unit 300 will be described in detail later.

The control circuit 530 configured above may include one or more processors such as CPUs. In addition, the control circuit 530 may include a programmable logic device such as field-programmable gate array (FPGA), instead of or in addition to the processors.

The drive signal generating circuit 540 generates the drive signal Com for use in driving the piezoelectric elements 311 possessed by the liquid ejecting head 310. More specifically, the drive signal generating circuit 540 includes a digital/analog (D/A) converter circuit and an amplifier circuit. In the drive signal generating circuit 540, the D/A converter circuit receives the waveform designating signal dCom from the control circuit 530 and converts this digital signal into an analog signal. Then, the amplifier circuit amplifies this analog signal based on the power potential VHV applied by the power circuit 520, thereby generating the drive signal Com. The drive signal Com contains a drive pulse PD, which is a signal waveform to be supplied to the piezoelectric elements 311. The drive signal generating circuit 540 supplies the drive pulse PD to the piezoelectric elements 311 via the switch circuit 340. Then, the switch circuit 340 switches based on the control signal SI to selectively supply at least part of a waveform contained in the drive signal Com, as the drive pulse PD.

The computer 700 supplies the reference point information Da and the route information db to the controller 600 and also supplies print data to the control module 500. In this embodiment, the computer 700 is electrically connected to the energy emitting section 330 and outputs a signal D2 for use in controlling the operation of the energy emitting section 330 based on a signal from the controller 600 or the control module 500.

1-3. Liquid Ejecting Unit

Figure 3:
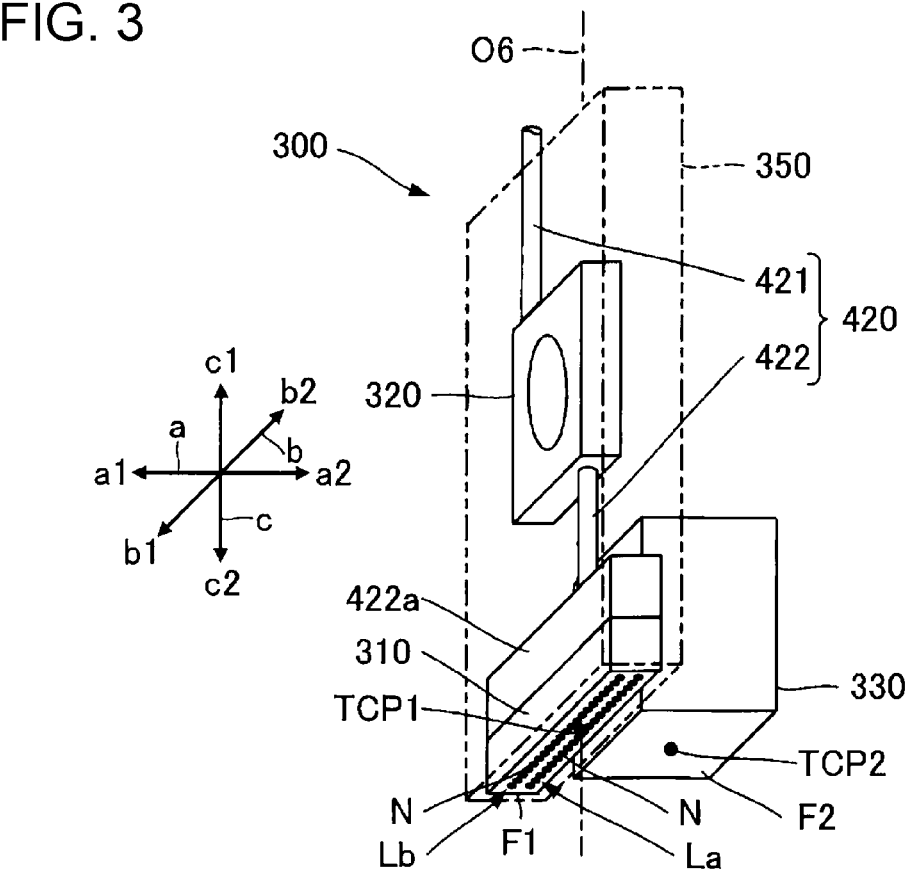
FIG. 3 is a schematic, perspective view of the liquid ejecting unit.

FIG. 3 is a schematic, perspective view of the liquid ejecting unit 300.

In the following description, a-, b-, and c-axes orthogonal to one another are used as appropriate. One direction along the a-axis is defined as an a1 direction, whereas the direction opposite to the a1 direction is defined as an a2 direction. Likewise, one direction along the b-axis is defined as a b1 direction, whereas the direction opposite to the b1 direction is defined as a b2 direction. One direction along the c-axis is defined as a c1 direction, whereas the direction opposite to the c1 direction is defined as a c2 direction.

The a-, b-, and c-axes correspond to coordinate axes in the tool coordinate system defined for the liquid ejecting unit 300. The relative positions and postures of the liquid ejecting unit 300 on the X-, Y-, and Z-axes depend on the movement of the robot 200. In the example of FIG. 3, the c-axis is an axis parallel to the sixth rotatable axis O6. In this case, the a-, b-, and c-axes do not necessarily have to be completely orthogonal to one another and may form angles ranging from 80° to 100° with one another.

As described above, the liquid ejecting unit 300 is provided with the liquid ejecting head 310, the pressure regulating valve 320, and the energy emitting section 330, all of which are supported by a support 350 indicated by the alternate long and two short dashes line in FIG. 3.

The support 350 is a substantially rigid body that may be made of a metal material. It should be noted that, although the support 350 has a boxlike shape in the example of FIG. 3, it may have any other shape.

The support 350 is attached to the second end of the arm 220, or the arm member 226. In which case, all of the liquid ejecting head 310, the pressure regulating valve 320, and the energy emitting section 330 are fixed to the arm member 226.

In the example of FIG. 3, the pressure regulating valve 320 is disposed closer to the side in the c1 direction than the liquid ejecting head 310 is, whereas the energy emitting section 330 is disposed closer to the side in the a2 direction than the liquid ejecting head 310 is.

Formed inside the support 350 is a supply flow passage 420, which is divided into an upstream flow passage 421 and a downstream flow passage 422 by the pressure regulating valve 320. In short, the supply flow passage 420 is provided with the upstream flow passage 421 via which the liquid reservoir 410 communicates with the pressure regulating valve 320 and the downstream flow passage 422 via which the liquid ejecting head 310 communicates with the downstream flow passage 422. In the example of FIG. 3, the downstream flow passage 422 of the supply flow passage 420 is partly formed by a flow passage member 422a, which separately supplies the ink from the pressure regulating valve 320 to a plurality of sites in the liquid ejecting head 310. The flow passage member 422a may include a plurality of substrates stacked together, each of which may be made of a resin material and has grooves and holes for an ink flow passage at appropriate locations.

The liquid ejecting head 310 includes: a nozzle surface F1; and a plurality of nozzles N exposed from the nozzle surface F1. In the example of FIG. 3, the direction normal to the nozzle surface F1 coincides with the c2 direction. The plurality of nozzles N form a first nozzle row La and a second nozzle row Lb, which are arranged side by side with a given interval therebetween along the a-axis. Each of the first nozzle row La and the second nozzle row Lb is an example of a nozzle row herein and includes a set of nozzles N linearly arrayed along the b-axis. In the liquid ejecting head 310, elements related to the nozzles N in the first nozzle row La are symmetric in configuration along the a-axis to those in the second nozzle row Lb.

The plurality of nozzles N arrayed in the first nozzle row La may or may not be aligned, along the b-axis, with corresponding nozzles N arrayed in the second nozzle row Lb. Alternatively, the elements may not be provided in relation to the nozzles N in one of the first nozzle row La and the second nozzle row Lb. In this example, however, the plurality of nozzles N in the first nozzle row La may or may not be aligned, along the b-axis, with corresponding nozzles N in the second nozzle row Lb.

The energy emitting section 330 has an emission surface F2 from which the energy, such as ultraviolet light, is to be emitted. In the example of FIG. 3, the direction normal to the emission surface F2 coincides with the c2 direction. In addition, the emission surface F2 is flush with the above nozzle surface F1. However, the directions normal to the nozzle surface F1 and the emission surface F2 may be different from each other. Furthermore, the emission surface F2 does not necessarily have to be flush with the nozzle surface F1; alternatively, the emission surface F2 may protrude from the nozzle surface F1 in the c1 or c2 direction.

The 3D object print apparatus 100 can set the tool center points to both the first reference point TCP1 and the second reference point TCP2, which are differently positioned on the liquid ejecting unit 300. In this case, the 3D object print apparatus 100 selectively performs a print operation in which the robot 200 moves so that the first reference point TCP1 traces a predetermined route and a curing operation in which the robot 200 moves so that the second reference point TCP2 traces a predetermined route. The 3D object print apparatus 100 employs a tool coordinate system with its origin set to the first reference point TCP1 during the print operation and, in turn, employs another tool coordinate system with its origin set to the second reference point TCP2 during the curing operation.

The first reference point TCP1 is a point at which the liquid ejecting head 310 is positioned. In the example of FIG. 3, the first reference point TCP1 corresponds to the center of the nozzle surface F1. The second reference point TCP2 is a point at which the energy emitting section 330 is positioned. In the example of FIG. 3, the second reference point TCP2 corresponds to the center of the emission surface F2. However, the first reference point TCP1 does not necessarily have to be the center of the nozzle surface F1; alternatively, it may be any point in the liquid ejecting unit 300 which is closer to the nozzle surface F1 than the emission surface F2. Likewise, the second reference point TCP2 does not necessarily have to be the center of the emission surface F2; alternatively, it may be any point in the liquid ejecting unit 300 which is closer to the emission surface F2 than the nozzle surface F1.

1-4. Operation of 3D Object Print Apparatus and 3D Object Print Method

Figure 4:
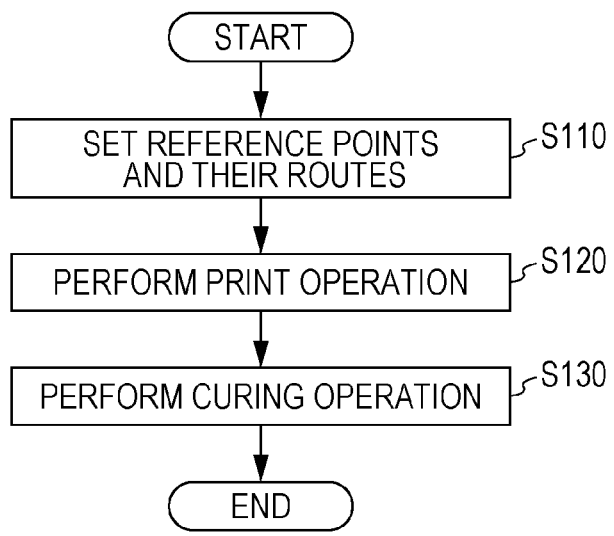
FIG. 4 is a flowchart of a 3D object print method according to the embodiment.

FIG. 4 is a flowchart of a 3D object print method according to this embodiment, which is performed by the above 3D object print apparatus 100. As illustrated in FIG. 4, the 3D object print apparatus 100 sequentially performs the three steps: Step S110 at which reference points and their routes are set; Step S120 at which the ink is ejected from the liquid ejecting head 310 onto the surface WF; and Step S130 at which the curing operation for the ink ejected at Step S120 is performed.

Figure 5:
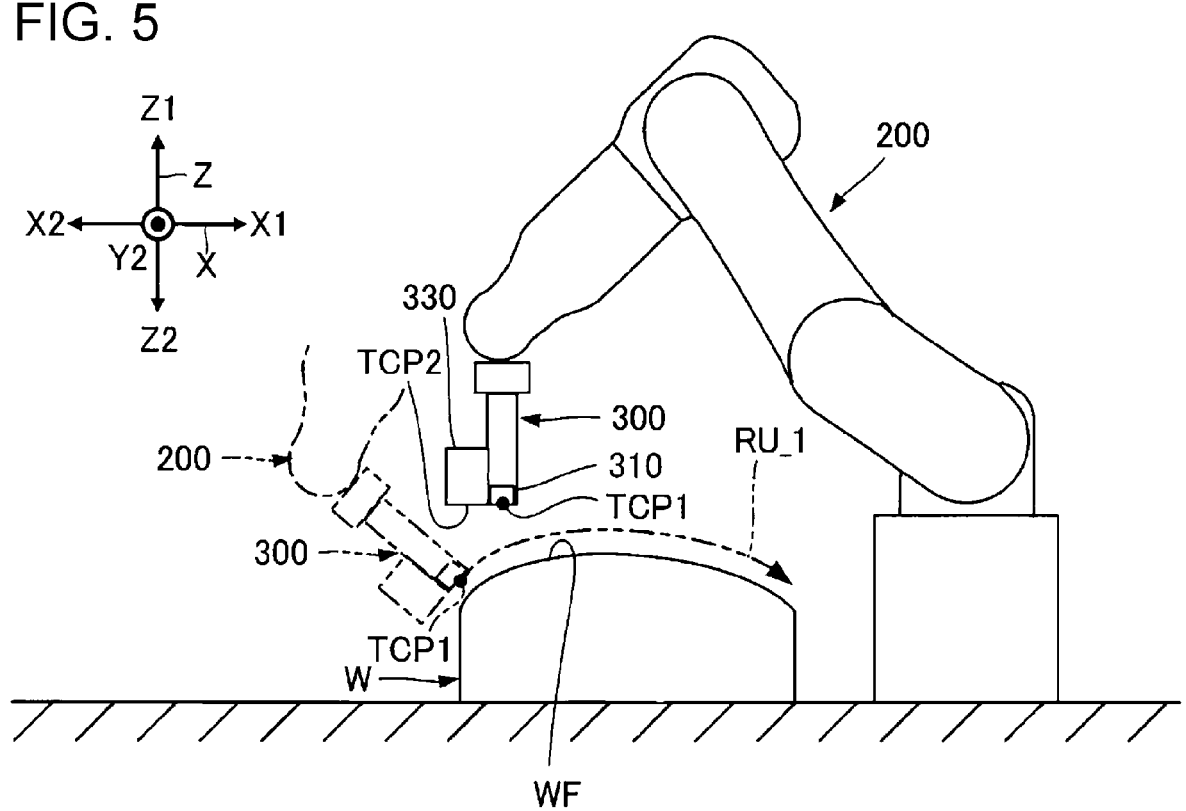
FIG. 5 illustrates a process of setting reference points and their routes in the 3D object print method.

FIG. 5 illustrates a process of setting reference points and their routes in the 3D object print method. At Step S110, the 3D object print apparatus 100 sets both the first reference point TCP1 and the second reference point TCP2 in the liquid ejecting unit 300. For this purpose, the 3D object print apparatus 100 may set one of the first reference point TCP1 and the second reference point TCP2 to a predetermined location in the base coordinate system and move the liquid ejecting unit 300 until a predetermined portion of the liquid ejecting unit 300 reaches this location. Then, the 3D object print apparatus 100 may also set the other of the first reference point TCP1 and the second reference point TCP2 to another predetermined location in the base coordinate system, based on the positional relationship between the first reference point TCP1 and the second reference point TCP2. By setting both the first reference point TCP1 and the second reference point TCP2 in this manner, the 3D object print apparatus 100 can generate the above reference point information Da.

Next, the 3D object print apparatus 100 sets a first route RU_1 based on the workpiece information regarding the location and shape of the workpiece W; the first route RU_1 is a route along which the first reference point TCP1 is to move in a first scan. Then, the 3D object print apparatus 100 also sets a second route RU_2 (not illustrated in FIG. 5) based on the workpiece information; the second route RU_2 is a route along which the second reference point TCP2 is to move in a second scan. By setting both the first route RU_1 and the second route RU_2, the 3D object print apparatus 100 can generate the above route information db. In this case, the first route RU_1 and the second route RU_2 may or may not coincide with each other. It is, however, preferable for both the first route RU_1 and the second route RU_2 to be completely or substantially parallel to each other and to completely or substantially coincide with each other as viewed from the direction normal to the surface WF. This can perform the print and curing operations appropriately, for example, even if the liquid ejecting unit 300 has a simple configuration.

Figure 6:
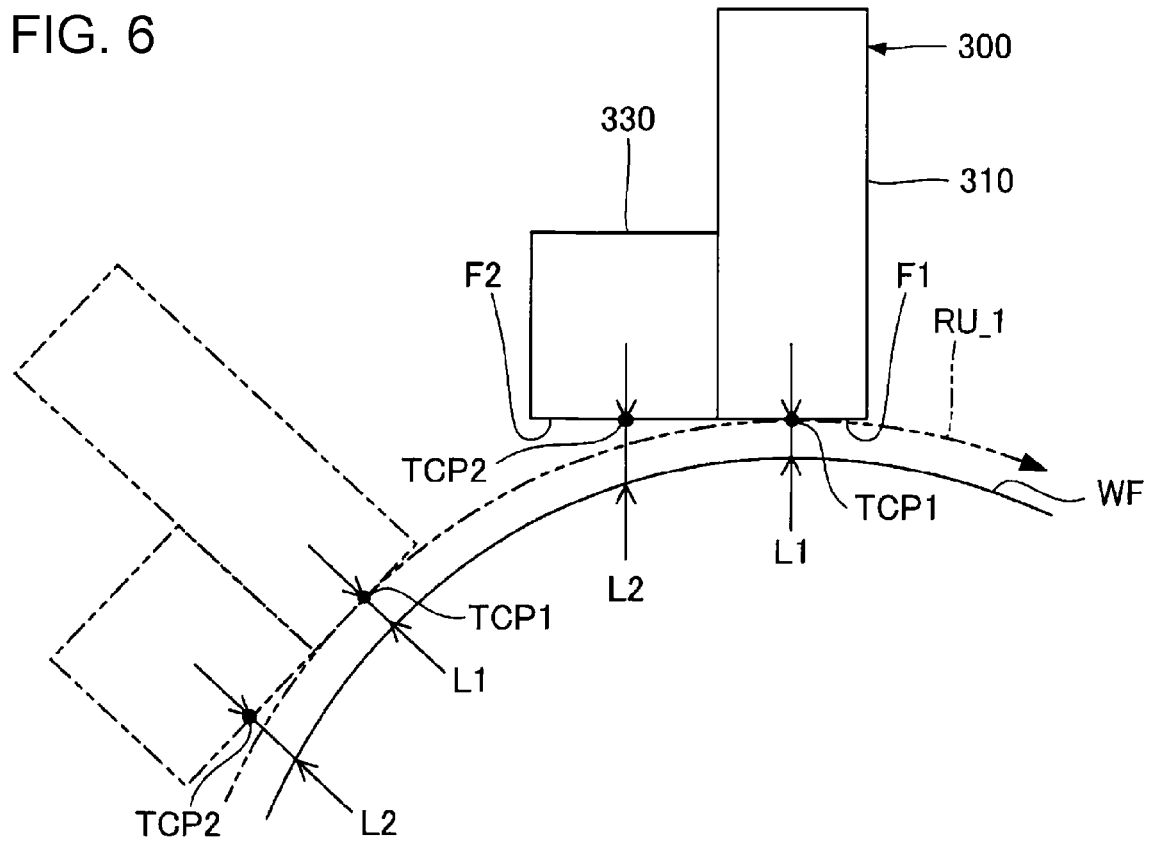
FIG. 6 is a schematic view of an operation at a first step in the 3D object print method.

FIG. 6 is a schematic view of an operation at Step S120, which is an example of a first step herein. At Step S120, the 3D object print apparatus 100 causes the liquid ejecting head 310 to eject the ink onto the surface WF of the workpiece W while moving the first reference point TCP1 along the first route RU_1. In this way, the 3D object print apparatus 100 can print desired pattern on the surface WF. The operation of the robot 200 at which the liquid ejecting unit 300 is moved along the first route RU_1 is an example of the first scan. During this operation, the liquid ejecting head 310 is positioned ahead of the energy emitting section 330 in the moving direction. In this case, the moving direction along the first route RU_1 is set to the a1 direction in the tool coordinate system.

During the above print operation, the distance between the surface WF and the first route RU_1 is kept substantially constant. In addition, the angle between the surface WF and the normal to the nozzle surface F1 of the liquid ejecting head 310 is also kept substantially constant. In this case, when the distance in the direction normal to the nozzle surface F1 between the surface WF and the first reference point TCP1 is denoted by L1, the distance L1 is kept constant along the entire first route RU_1. As a result, the liquid ejecting head 310 can place the ink on the surface WF precisely. In the example of FIG. 6, the normal to the nozzle surface F1 is completely or substantially orthogonal to the surface WF. This configuration can provide higher print quality than a configuration in which the normal to the nozzle surface F1 is inclined relative to the surface WF.

On the other hand, when the distance in the direction normal to the emission surface F2 between the surface WF and the second reference point TCP2 is denoted by L2, the distance L2 may fluctuate depending on a varying curvature of the surface WF at Step S120. In addition, the distance L2 is longer than the distance L1 at Step S120 because the surface WF, which is completely or substantially orthogonal to the normal to the nozzle surface F1 of the liquid ejecting head 310 as described above, is curved outwardly.

At Step S120, the energy emitting section 330 emits no energy or energy at only enough to the pinning. The pinning is the process to partially cure the ink ejected at Step S120 onto the surface WF. Therefore, the nozzles N are less likely to be clogged at Step S120, as compared to a configuration in which the energy emitting section 330 emits as much energy at Step S120 as at Step S130. It should be noted that the pinning of the ink is performed in order to suppress the ink from being displaced from an intended location on the surface WF.

For the above reason, the energy per unit area with which the energy emitting section 330 irradiates the surface WF at Step S120 is preferably smaller in amount than that at Step S130. In this way, it is possible to reduce the risk of the nozzles N being clogged at Step S120, as compared to a configuration in which the amount of energy with which the surface WF is irradiated at Step S120 is equal to or more than that at Step S130.

Figure 7:
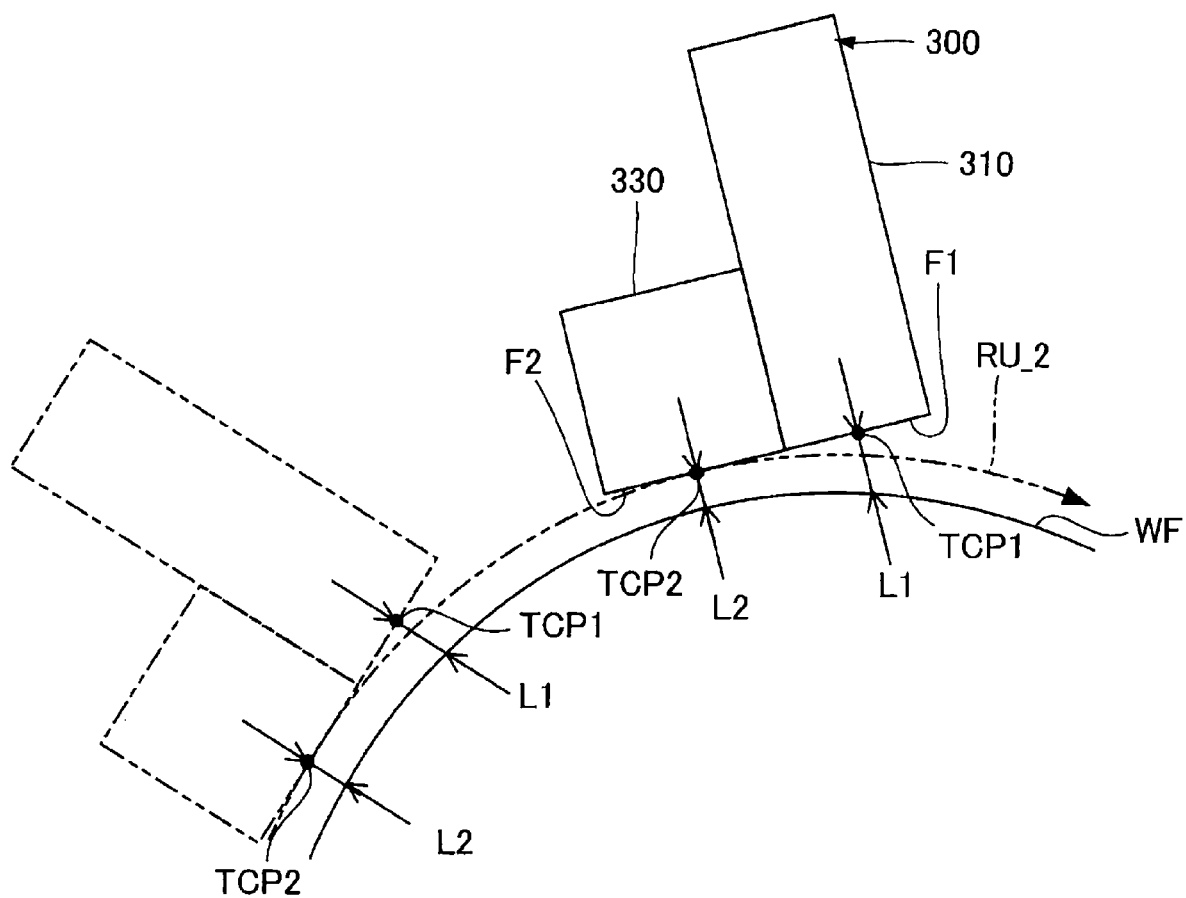
FIG. 7 is a schematic view of an operation at a second step in the 3D object print method.

FIG. 7 is a schematic view of an operation at Step S130, which is an example of a second step herein. At Step S130, the 3D object print apparatus 100 causes the energy emitting section 330 to irradiate the ink on the surface WF of the workpiece W with the energy while moving the second reference point TCP2 along the second route RU_2. In this way, the 3D object print apparatus 100 can cure or solidify the ink on the surface WF which the ink was dropped from the nozzles N at Step S120. The operation of the robot 200 at which the liquid ejecting unit 300 is moved along the second route RU_2 is an example of the second scan. In this case, the liquid ejecting head 310 is also positioned ahead of the energy emitting section 330 in the moving direction, as at Step S120 described above.

It should be noted that the liquid ejecting head 310 ejects no ink at Step S130: therefore, the energy from the energy emitting section 330 does not affect the ink ejecting operation of the liquid ejecting head 310. The second scan is conducted after the first scan, and these are not conducted at the same time. Further, between the first scan and the second scan, the robot 200 may perform another operation including the operation of returning to the initial position of the first scan.

When the distance in the direction normal to the emission surface F2 between the surface WF and the second reference point TCP2 is denoted by L2, the distance L2 is kept constant along the entire second route RU_2. This is because the distance between the second route RU_2 and the surface WF is kept completely or substantially constant, and the normal to the emission surface F2 of the energy emitting section 330 forms a completely or substantially constant angle with the surface WF. This enables the energy emitting section 330 to irradiate the surface WF with uniform energy. In the example of FIG. 6, the normal to the emission surface F2 is completely or substantially orthogonal to the surface WF. This configuration suppresses the energy from being reflected by the surface WF and reaching the nozzles N, as compared to a configuration in which the normal to the emission surface F2 is inclined relative to the surface WF.

On the other hand, when the distance in the direction normal to the nozzle surface F1 between the surface WF and the first reference point TCP1 is denoted by L1, the distance L1 fluctuates depending on a varying curvature of the surface WF at Step S130. Furthermore, the distance L1 is longer than the distance L2 at Step S130 because the surface WF, which is completely or substantially orthogonal to the normal to the emission surface F2 of the energy emitting section 330 as described above, is curved outwardly. In other words, the distance L2 is shorter than the distance L1 at Step S130. This configuration, even when the energy emitting section 330 emits the energy, suppresses the energy from being reflected by the surface WF and reaching the area around the nozzles N.

At Step S130, the energy emitting section 330 needs to emit energy at enough intensity to completely cure the ink on the surface WF. In this way, it is possible to reduce the risk of the ink peeling off the surface WF after Step S130. In this case, the energy emitting section 330 needs to irradiate the surface WF with a larger amount of energy per unit area at Step S130 than at Step S120.

To increase the productivity, the speed at which the second reference point TCP2 moves along the second route RU_2 during Step S130 is preferably set to be higher than that at which the first reference point TCP1 moves along the first route RU_1 during Step S120. The moving speeds of the first reference point TCP1 and the second reference point TCP2 may be adjusted by increasing the energy intensity of the energy emitting section 330.

As described above, a three-dimensional (3D) object print apparatus 100 includes a liquid ejecting head 310, an energy emitting section 330, and a robot 200. Herein, the robot 200 is an example of a moving mechanism. The liquid ejecting head 310 has a nozzle surface F1 with nozzles N through which ink is to be ejected. Herein, the ink is an example of liquid. The energy emitting section 330 has an emission surface F2 from which energy is to be emitted, the energy being used to cure or solidify the ink. The robot 200 changes locations and postures of the liquid ejecting head 310 and the energy emitting section 330 relative to a workpiece W, the workpiece W having a 3D shape. Herein, the "cure" implies the concept in which a curable resin such as a thermal- or light-curable resin is cured through a reaction such as a polymerization reaction. Herein, the "solidify" implies the concept in which a solid is obtained from a dissolved substance by removing a dissolvent from a solution or in which a solid is obtained from a dispersoid by removing a dispersion medium from a dispersion liquid.

As described above, the 3D object print apparatus 100 performs Steps S120 and S130 in order. Herein, Step S120 is an example of a first step, and Step S130 is an example of a second step. At Step S120, the liquid ejecting head 310 ejects the ink onto the workpiece W while conducting a first scan which the robot 200 changes a location of the liquid ejecting head 310 and the energy emitting section 330 relative to the workpiece W along a first route RU_1. At Step S130, the energy emitting section 330 irradiates the ink on the workpiece W with the energy while conducting a second scan which the robot 200 changes the location of the liquid ejecting head 310 and the energy emitting section 330 relative to the workpiece W along a second route RU_2.

In the above case, the 3D object print apparatus 100 satisfies L1<L2 at Step S120 and L1>L2 at Step S130, where L1 denotes a distance in a direction normal to the nozzle surface F1 between the surface WF and a first reference point TCP1, and L2 denotes a direction in a direction normal to the emission surface F2 between the surface WF and a second reference point TCP2.

In the above relationships, L1 does not necessarily have to denote the distance between the surface WF and the first reference point TCP1; alternatively, L1 may denote a distance in the direction normal to the nozzle surface F1 between the workpiece W and the nozzle surface F1. Likewise, L2 does not necessarily have to denote the distance between the surface WF and the second reference point TCP2; alternatively, L2 may denote a distance in the direction normal to the emission surface F2 between the workpiece W and the emission surface F2. Even in this case, the 3D object print apparatus 100 can satisfy L1<L2 at Step S120 and L1>L2 at Step S130.

By satisfying L1<L2 at Step S120 in the three-dimensional object print apparatus 100, the ink can be placed on the workpiece W precisely by the liquid ejecting head 310 because the flight length of the ink drop can be shorter. By satisfying L1>L2 at Step S130, the ink on the workpiece W can be cured or solidified more effectively than when L1>L2 because the decay of the energy can be suppressed. In this way, it is possible to place the ink on the workpiece W precisely at desired locations and to cure or solidify the ink effectively, thereby successfully forming and providing a quality print image.

The 3D object print apparatus 100 may perform Steps S120 and S130 separately. Thus, the energy emitting section 330 may emit no energy at Step S120 or may emit a smaller amount of energy at Step S120 than at Step S130. In this way, it is possible to reduce the risk of the ink near the nozzles N cured or solidified by the energy from the energy emitting section 330 at Step S120.

Since L1>L2 is satisfied at Step S130, the energy from the energy emitting section 330 is less likely to reach the area near the nozzles N, or the energy weaker than that when L1<L2 reaches this area. Therefore, even if the energy emitting section 330 emits enough energy to cure or solidify the ink on the workpiece W, this energy is less likely to cure or solidify the ink near the nozzles N.

Since the liquid ejecting head 310 ejects the ink onto the workpiece W at Step S120 as described above, it does not have to eject the ink at Step S130. Therefore, the liquid ejecting head 310 may eject no ink onto the workpiece W at Step S130.

At Step S120, as described above, the energy emitting section 330 may irradiate the ink on the workpiece W with the energy. In this way, the energy emitting section 330 can semi-cure or semi-solidify the ink on the workpiece W, thereby suppressing the ink from accidentally flowing onto the workpiece W after the ink has been placed at Step S120 and before the ink is irradiated with the energy at Step S130. In this case, the energy emitting section 330 may cure or solidify the ink on a surface WF of the workpiece W to the extent that the ink does not accidentally flow. Thus, the energy emitting section 330 does not have to completely cure or solidify the ink on the workpiece W at Step S120. Consequently, the energy emitting section 330 may emit only a small amount of energy at Step S120, thereby reducing the risk of the nozzles N clogged by the energy from the energy emitting section 330.

The energy per unit area with which the energy emitting section 330 irradiates the ink on the workpiece W at Step S130 may be larger in amount than the energy per unit area with which the energy emitting section 330 irradiates the ink on the workpiece W at Step S120. In this way, the energy from the energy emitting section 330 is less likely to clog the nozzles N at Step S120 and, in turn, can completely cure or solidify the ink on the workpiece W at Step S130.

A time per unit area over which the energy emitting section 330 irradiates the ink on the workpiece W with the energy at Step S130 may be longer than a time per unit area over which the energy emitting section 330 irradiates the ink on the workpiece W with the energy at Step S120. In this way, the energy emitting section 330 can emit the energy to readily and completely cure or solidify the ink on the workpiece W at Step S130.

The energy with which the energy emitting section 330 irradiates the ink on the workpiece W at Step S130 may be higher in intensity than the energy with which the energy emitting section 330 irradiates the ink on the workpiece W at Step S120. In this way, the energy emitting section 330 can emit the energy to readily and completely cure or solidify the ink on the workpiece W at Step S130.

As described above, relative positions of the liquid ejecting head 310 and the energy emitting section 330 may be fixed. The robot 200 may move both the liquid ejecting head 310 and the energy emitting section 330 together with one another. This configuration can readily set a reference point and a route for use in controlling operations of the robot 200 at Steps S120 and S130, as compared to a configuration in which the robot 200 moves the workpiece W. Furthermore, the configuration in which the robot 200 moves the workpiece W may cause the workpiece W to deviate from an ideal route due to vibration of the workpiece W being moved. This deviation might become prominent, especially when the workpiece W is considerably larger in size than the robot 200 or is less rigid. For this reason, the robot 200 moves both the liquid ejecting head 310 and the energy emitting section 330 without moving the workpiece W during the print operation, thereby reducing the workpiece W largely deviating from an ideal route due to its vibration.

Both the nozzle surface F1 and the emission surface F2 may face the workpiece W at Steps S120 and S130. This configuration successfully switches between operations at Steps S120 and S130 in a short time, as compared to a configuration in which one of the nozzle surface F1 and the emission surface F2 does not face the workpiece W at Steps S120 and S130. Moreover, with the configuration in which both the nozzle surface F1 and the emission surface F2 face the workpiece W at Step S120, the ink can be ejected onto the workpiece W through the nozzles N formed on the nozzle surface F1, and simultaneously the ink on the workpiece W can be irradiated with the energy emitted through the emission surface F2. Consequently, it is possible to effectively pin the ink on the workpiece W at Step S120.

A direction in which the robot 200 changes the location of the liquid ejecting head 310 relative to the workpiece W at Step S120 may coincide with a direction in which the robot 200 changes the location of the liquid ejecting head 310 relative to the workpiece W at Step S130. In short, the first route RU_1 and the second route RU_2 may coincide with each other. This configuration can appropriately control a length of a time between when the ink is placed on the workpiece W and when the ink is irradiated with the energy, as compared to a configuration in which the direction in which the robot 200 changes the location of the liquid ejecting head 310 relative to the workpiece W at Step S120 differs from the direction in which the robot 200 changes the location of the liquid ejecting head 310 relative to the workpiece W at Step S130. Consequently, it is possible to provide quality printing.

As described above, a three-dimensional (3D) object print apparatus 100 includes a liquid ejecting unit 300 including a liquid ejecting head 310 and an energy emitting section 330. Herein, the liquid ejecting unit 300 is an example of an apparatus. The 3D object print apparatus 100 sets a first reference point TCP1, a second reference point TCP2, a first route RU_1, and a second route RU_2. The first reference point TCP1 indicates a location in the liquid ejecting unit 300, whereas the second reference point TCP2 indicates another location in the liquid ejecting unit 300. The first route RU_1 is a route along which the first reference point TCP1 is to move, whereas the second route RU_2 is a route along which the second reference point TCP2 is to move.

At Step S120, the liquid ejecting head 310 ejects ink onto a workpiece W, and simultaneously the robot 200 changes a location of the first reference point TCP1 relative to the workpiece W along the first route RU_1. At Step S130, the energy emitting section 330 irradiates the ink on the workpiece W with energy, and simultaneously the robot 200 changes a location of the second reference point TCP2 relative to the workpiece W along the second route RU_2.

Using the first reference point TCP1 and the second reference point TCP2 in the above manner, the first route RU_1 and the second route RU_2 may be easily set in accordance with each step. Further, the first reference point TCP1 may be a point indicating a location of the liquid ejecting head 310, more specifically, a point positioned closer to a nozzle surface F1 than an emission surface F2. The second reference point TCP2 may be a point indicating a location of the energy emitting section 330, more specifically, a point positioned closer to the emission surface F2 to the nozzle surface F1.

As described above, the first route RU_1 may be set so that a distance L1 in a direction normal to the nozzle surface F1 between the workpiece W and the first reference point TCP1 is kept constant. Setting the first route RU_1 in this manner enables the liquid ejecting head 310 to place the ink on the workpiece W preciously.

As described above, the second route RU_2 may be set so that a distance L2 in a direction normal to the emission surface F2 between the workpiece W and the second reference point TCP2 is kept constant. Setting the second route RU_2 in this manner enables the energy emitting section 330 to uniformly irradiate the ink on the workpiece W with energy.

MODIFICATIONS

The foregoing embodiment may be modified in various ways. Some specific modifications of the embodiment will be described below. It should be noted that such modifications may be selectively combined as appropriate provided that it is possible to ensure the consistency therebetween.

First Modification

A moving mechanism is a six-axis vertical articulated robot in the foregoing embodiment; however, the moving mechanism is not limited to this configuration. The moving mechanism has only to change a location and posture of a liquid ejecting head relative to a workpiece in a 3D manner. Thus, the moving mechanism may be a vertical articulated robot having a plurality of axes other than six or a multi-axis horizontal articulated robot. A movable part of the robot arm is not limited to a rotation mechanism; alternatively, the movable part may be an expansion mechanism.

Second Modification

A liquid ejecting head is fixed to a second end of the robot arm with screws in the foregoing embodiment; however, the fixing mechanism is not limited to this configuration. Alternatively, the liquid ejecting head may be fixed to the second end of the robot arm with a holding mechanism such as a robot hand. In which case, this holding mechanism may be provided at the second end of the robot in order to hold the ejection head.

Third Modification

The moving mechanism is configured to move the liquid ejecting head in the foregoing embodiment; however, the moving mechanism is not limited to this configuration. Alternatively, the moving mechanism may be configured to make the liquid ejecting head stationary and move a workpiece in such a way that its location and posture changes relative to the liquid ejecting head in a 3D manner. In which case, the moving mechanism may have a holding mechanism, such as a robot hand, at the second end of the robot arm in order to hold the workpiece.

Fourth Modification

A three-dimensional object print apparatus uses a single type of ink to print information; however, it is not limited to this configuration. Alternatively, the three-dimensional object print apparatus may use multiple types of ink.

Fifth Modification

Application of a three-dimensional object print apparatus according to the present disclosure is not limited to print use. Alternatively, the three-dimensional object print apparatus may be used to manufacture color filters for liquid crystal displays, in which case, the three-dimensional object print apparatus may eject a solution containing a color material. Furthermore, the three-dimensional object print apparatus may be used to manufacture wires and electrodes for circuit boards, in which case, the three-dimensional object print apparatus may eject a solution containing a conductive material. Moreover, the three-dimensional object print apparatus may be used as jet dispensers to apply liquid such as glue to a workpiece.

What is claimed is:
1. A three-dimensional object print apparatus comprising:
a liquid ejecting head having a nozzle surface provided with a nozzle through which liquid is to be ejected;
an energy emitting section having an emission surface from which energy is to be emitted for cure or solidify the liquid from the liquid ejecting head; and
a moving mechanism that changes locations and postures of the liquid ejecting head and the energy emitting section relative to a workpiece, the workpiece having a three-dimensional shape,
wherein the three-dimensional object print apparatus performs a first step at which the liquid ejecting head ejects the liquid onto the workpiece while conducting a first scan which the moving mechanism changes the location of the liquid ejecting head and the energy emitting section relative to the workpiece,
wherein the three-dimensional object print apparatus performs a second step at which the energy emitting section irradiates the liquid on the workpiece with the energy while conducting a second scan which the moving mechanism changes the location of the liquid ejecting head and the energy emitting section relative to the workpiece,
wherein L1<L2 at the first step and L1>L2 at the second step, where L1 denotes a distance in a direction normal to the nozzle surface between the workpiece and the nozzle surface, and L2 denotes a distance in a direction normal to the emission surface between the workpiece and the emission surface, wherein during the first step the liquid ejecting head and the energy emitting section are moved by the moving mechanism so that a fluctuation of L1 is smaller than a fluctuation of L2, and wherein during the second step the liquid ejecting head and the energy emitting section are moved by the moving mechanism so that the fluctuation of L2 is smaller than the fluctuation of L1.

2. The three-dimensional object print apparatus according to claim 1, wherein
the liquid ejecting head ejects no liquid onto the workpiece at the second step.

3. The three-dimensional object print apparatus according to claim 1, wherein
the energy emitting section irradiates the liquid on the workpiece with the energy at the first step.

4. The three-dimensional object print apparatus according to claim 3, wherein
the energy emitting section does not cure or solidify some of the liquid on the workpiece at the first step.

5. The three-dimensional object print apparatus according to claim 3, wherein
the energy per unit area with which the energy emitting section irradiates the liquid on the workpiece at the second step is larger in amount than the energy per unit area with which the energy emitting section irradiates the liquid on the workpiece at the first step.

6. The three-dimensional object print apparatus according to claim 5, wherein
a time per unit area over which the energy emitting section irradiates the liquid on the workpiece with the energy at the second step is longer than a time per unit area over which the energy emitting section irradiates the liquid on the workpiece with the energy at the first step.

7. The three-dimensional object print apparatus according to claim 5, wherein
the energy with which the energy emitting section irradiates the liquid on the workpiece at the second step is higher in intensity than the energy with which the energy emitting section irradiates the liquid on the workpiece at the first step.

8. The three-dimensional object print apparatus according to claim 1, wherein
relative locations of the liquid ejecting head and the energy emitting section are fixed, and
the moving mechanism moves both the liquid ejecting head and the energy emitting section together with one another.

9. The three-dimensional object print apparatus according to claim 1, wherein
both the nozzle surface and the emission surface face the workpiece at the first step and the second step.

10. The three-dimensional object print apparatus according to claim 1, wherein
a direction in which the moving mechanism changes the location of the liquid ejecting head relative to the workpiece at the first step coincides with a direction in which the moving mechanism changes the location of the liquid ejecting head relative to the workpiece at the second step.

11. The three-dimensional object print apparatus according to claim 1, wherein during the first step the liquid ejecting head and the energy emitting section are moved by the moving mechanism so that L1 is kept substantially constant, and wherein during the second step the liquid ejecting head and the energy emitting section are moved by the moving mechanism so that L2 is kept substantially constant.

* * * * *